United States Patent

[11] 3,588,452

[72] Inventor Robert Kee
Washington, D.C.
[21] Appl. No. 784,690
[22] Filed Dec. 18, 1968
[45] Patented June 28, 1971
[73] Assignee The United States of America as represented by the Secretary of the Navy

[54] PHOTOELECTRIC READING SYSTEM
6 Claims, 2 Drawing Figs.

[52] U.S. Cl. 235/61.11E, 340/146.3F
[51] Int. Cl. G06k 7/00
[50] Field of Search 235/61.115, (Cursory; 340/146.3

[56] References Cited
UNITED STATES PATENTS

| | | | |
|---|---|---|---|
| 3,104,369 | 9/1963 | Rabinow et al. | 340/146.3 |
| 3,243,776 | 3/1966 | Abbott, Jr. et al. | 340/146.3 |

*Primary Examiner*—Thomas A. Robinson
*Attorneys*—R. S. Sciascia, M. L. Crane and A. L. Branning

ABSTRACT: This disclosure is directed to an automatic electro-optical system designed to digitize and convert scientific data appearing on a film into a format suitable for computer operation. The system allows for sidewise slippage of the film while ensuring detection of all the information across the width of the film as the film passes by the detection means.

INVENTOR

ROBERT KEE

BY Melvin L. Crane AGENT

[signature] ATTORNEY

INVENTOR

ROBERT KEE

BY Melvin L Crane AGENT

ATTORNEY

PHOTOELECTRIC READING SYSTEM

The invention described herein may be manufactured and used by or for the Government of the United States of America for governmental purposes without the payment of any royalties thereon or therefor.

BACKGROUND OF THE INVENTION

Heretofore film scanners have fallen into basically two categories, i.e. cathode-ray scanners and light detector photocell scanners. In cathode-ray scanners, a controlled point of light is programmed to search and follow the filmed data. In photocell scanner, the photocells are fixed in position and observe the film data as the film passes over the photocells. Such scanners give false information or no information, if the film deviates from a particular track or channel because then the fixed photocells do not follow the film and do not read all the information. Therefore, some information is lost and not detected as the film is read.

BRIEF SUMMARY OF THE INVENTION

This invention overcomes the drawbacks of the prior art scanners by the use of sufficient linearly aligned photocells to permit film misalignment in combination with a scanner and shift register which permits detection of information and proper recording of the detected information. No specific photocell is assigned to a specific data channel on the film. Scanning for data is accomplished by gating in sequence the outputs of each of the photocells starting at one end of the row of photocells. The first photocell which detects a shift in film density represented by filmed information produces the data detection signal and produces the scanning of all of the photocells sequentially. The first answer signal produced during the scanning sequence initiates loading of the photocell signals into a shift register sequentially. The result is such that the data is presented into the shift register regardless of the shift of the data position on the film. The position in the shift register can then be properly identified and dumped into proper storage for subsequent conversion onto a magnetic tape, drum or other suitable well-known means.

It is therefore an object of the present invention to provide an electro-optic system for automatically converting film recorded data into computer information for quickly determining the information.

Another object is to provide a system which permits off-line shifting of the film from which information is being obtained.

Still another object is to provide a system for obtaining film data which may be stored for a quick review of the information if desired.

Yet another object is to provide electronic scanning of photographic data with fixed photocells while compensating for shifting of the film along its path.

Other and more specific objects of the invention will become apparent upon a careful consideration of the following detailed description when taken together with the accompanying drawing.

BRIEF DESCRIPTION OF THE DRAWING

The drawing illustrates a schematic-block diagram of the system illustrating the relative elements.

DESCRIPTION OF THE INVENTION

Figure 1A:
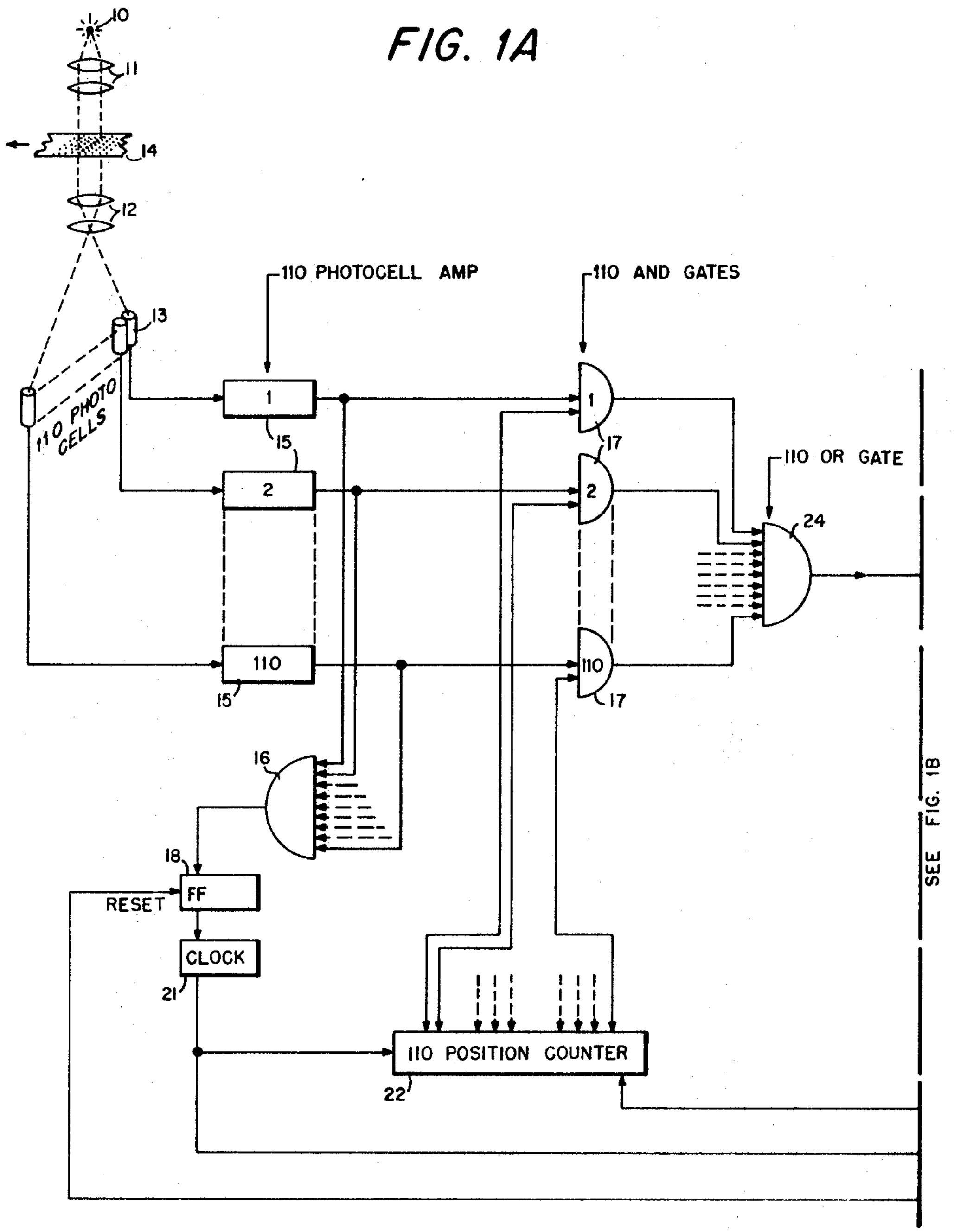
Figure 1B:
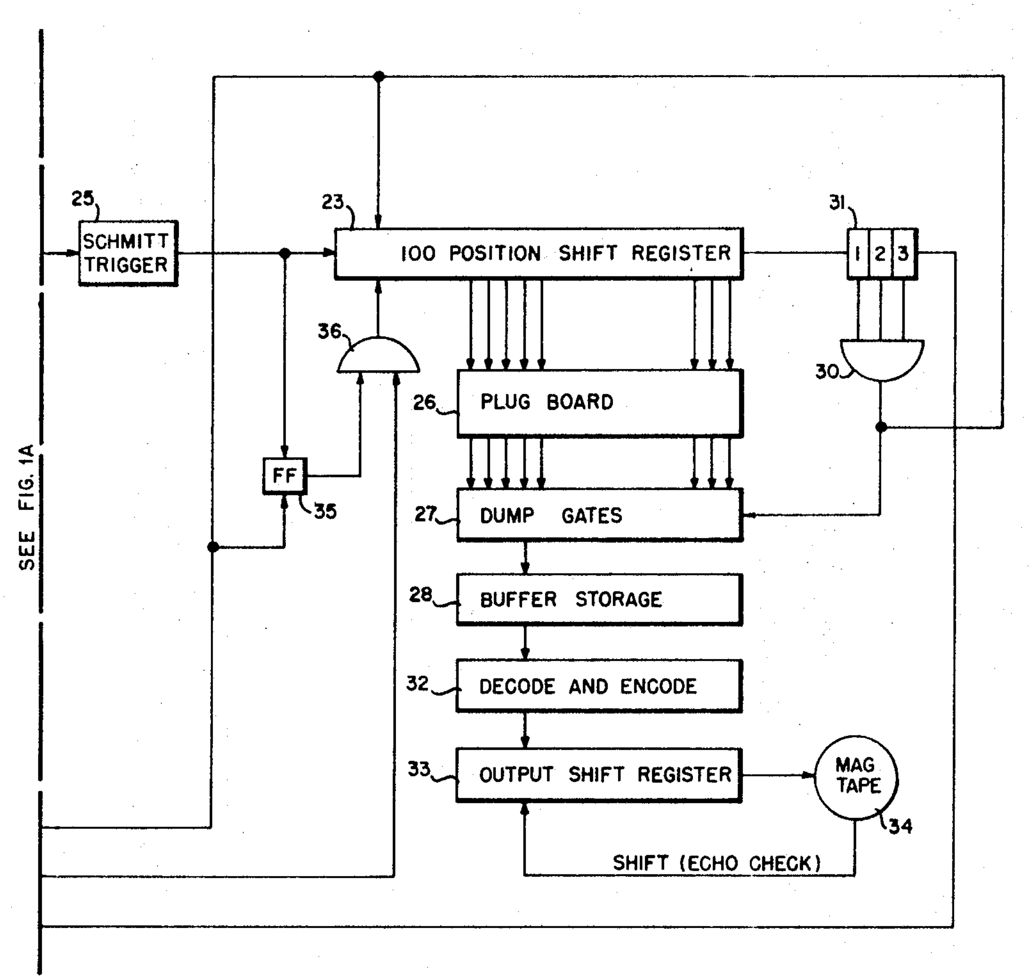

Now referring to the drawings, there is shown by illustration, an electro-optical system for carrying out the invention. As shown, a light source 10 directs a light through appropriate lenses 11 and 12 toward a plurality of linearly aligned side-by-side photosensitive elements 13 such as a photocell which is biased to produce a negative voltage while light is incident thereon. The photocells are brought up to zero potential upon light being blocked by data on a film or any other means. A photofilm 14, which after being processed is transparent with the data thereon opaque, is passed through the light path from the light source to the photocells along a path between the optical lenses. The outputs of each of the photocells are amplified by separate amplifiers 15 and gated together through an OR gate 16 and are also directed separately to separate AND gates 17, one for each photocell. The output of OR gate 16 is directed to a detection flip-flop 18 which "sets" the detection flip-flop upon the receipt of a signal from one of the photocells through the OR gate 16. The detection flip-flop activates a clock or scan pulse generator 21 which starts scanning the photocells for information by stepping a 110 position counter 22 whose outputs are gated with and gates 17 sequentially. The clock also sends pulses to a 100 position shift register 23 thru the first answer gate 36 for operation of the shift register. The clock or scan pulse generator is adjusted to the film speed in order to enable detection of all of the information thereon. The outputs of the photocells are scanned by the pulse scanner 22 which in this application is shown as a 110 position counter, one for each of the 110 photocells. Once the scanner is initiated by the clock, the output pulses of the 110 position counter will provide a gate control signal to the respective AND gates 17 for each of the respective outputs from the photocells. The signal through the AND gate is directed to a 110 OR gate 24 from which the signal passes through a pulse shaping and noise rejection Schmitt Trigger 25 to the 100 position shift register 23. As the photocells are being scanned sequentially, the first signal representing a data bit answer sets the first answer flip-flop 35 which then permits the first answer gate to pass the shift pulse from the clock to start loading the shift register. The first signal received by the shift register is loaded in the first position, then each signal registered thereafter will be registered in the proper position relative to the first photocell that produced an output due to the information on the film. For instance, if the first signal was produced by the eighth photocell and the next information was six photocells away or detected by photocell 14 then the first information signal (from the eight photocell) will be indicated by the first position in the shift register and the signal from the 14 photocell will be six positions away from the first registered signal. All the signals registered in the shift register will be relative to the first signal received that is, shifted the same number of spaces as that of the number of photocells away from the first photocell to detect information. The parallel outputs of the 100 position register are wired to a conventional I.B.M. format plug board 26 so that the information loaded into the shift register can be arranged as desired for feeding to a buffer storage 28 through the dump gates 27 for recording.

The system is provided with a three counter control 31 which resets the scan and the shift register for three separate scans of each row of recorded data and loading of the output signals for the information as the film passes the photocells. Thus, any information that may appear on the film should be picked up by at least one of the three scan functions and loaded into the buffer store 28. Subsequent to the third scan, the three-counter unit directs a signal to the dump gates 27 which dumps the information to a magnetic tape, computer, or other storage means through a decode and encode 32 and an output shift register 33 which is connected with the recording means 34. A shift echo clock is provided to properly direct the information onto the recorder. The three-counter element also directs a signal to the detection flip-flop to reset the detector flip-flop and the first answer flip-flop so that the detection flip-flop waits until addition information is detected by the photocells and is activated by a signal through the OR gate 16 which starts another scan information recording sequence.

As an example of operation and assembly of the elements relative to each other, the data being converted is obtained by film within any well-known equipment such as a current meter. The film is developed which leaves the information in the form of linearly aligned dots along the length and width such as for instance 25 different equally spaced channels in which the dots are linearly aligned across the width of the film as well as linearly along the channels. The film base is transparent after being developed such that light will shine through the film except in those spots in which the data is recorded. The film is passed between the optical lenses such that light shines through the film across the width thereof onto 110 aligned photocells. The film is only wide enough to cover 100 photocells; therefore, there are five photocells on each side of the film to allow for film slippage on a line along the photocells. Thus, the film may slip in either direction a distance that would overlap as many as five photocells. Since the film covers 100 photocells, the slippage is 5 percent in either direction which is allowing for considerable slippage.

The shift register is provided with 100 loading positions which is sufficient to record data recorded over the entire width of the film. Since there are 110 photocells there must be 110 input contacts on the scan device so that a signal can be transmitted to the shift register from any of the photocells. However, since the film is only 100 photocells wide only 100 output signals could possibly be transmitted to the shift register. The shift register loads in the first position the output of the photodetector that detects the first bit of information when scanned and the scan is initiated by the output of the first photodetector that detects any information. The shift register is then shifted one position as each of the succeeding photocells are scanned. Thus, as each output of the photocell is shifted to ground due to the presence of information on the film, the signal will be recorded by the shift register to represent the data position on the film. As each line of information represented by the different channels is scanned three separate times, the information is loaded into the shift register each time and the information is directed into the buffer store in accordance with the sequence setting of the plug board. From the buffer store the information is serially recorded on the magnetic tape or drum upon initiation of the dump gate.

In order to load the data signals into the shift register in the channel order in which the data appears on the film, the first channel may be made as a solid line so that the first channel always results in a signal which is loaded into the first position of the shift register. Thus, regardless whether the data of the first channel is over the first photocell on the ninth photocell, the first channel data will be loaded into the shift register in the first position. The other channel data will then be loaded in accordance with their position relative to the first channel. In this manner, the above-described system may be used to read and interpret analog data such as a solid curved line on a transparent base such as glass, plastic, etc. In this manner the system may be used to interpret data recorded by various oceanography equipment such as a bathometer. Thus, in measuring a line on a base, the first channel is made as a solid line and as the photocells are scanned, the outputs of the photocell under the data line during incremental sweeps will be loaded into the shift register and thence to the magnetic tape or drum.

Since this system is programmed not to load signals into the shift register until a channel having a data indication has been reached, it can be seen that the film upon which the data is recorded may be over the first photocell or any other photocell. Therefore, when a film covering a specific number of photocells shifts from a normal line of movement, the recorded data may be detected by other photocells which are outside of the normal line of travel. Therefore, the above-described system may be used for data interpretation without being concerned too much with the alignment of the film. The only requirement is that the photocell detectors be in a line which is sufficient to allow for sidewise movement of the film passing over the photocells. Additionally, this system is capable of reading reversed film, that is the film being opaque and the data transparent. By reversing the voltages to the photocells, the output signals are identical and the operation is the same.

Since the system is able to record data on a line across the whole width of the film, the system may be used to decode any format. Additionally, the plug board may be arranged such that only a specific group of photodetectors are operational, therefore, specific data along a specific width of the film may be recorded without operation of the remainder of the photodetectors.

As an example of operation and assuming that all channels along the film are used to record information as it is detected and that the first channel is adapted to include information in each and every information row across the width of the film, the film is developed and ready for use. The film passes over the photodetectors, and as the first bit of information begins to cross a photodetector and blocks some light, a signal is produced. This initial output signal may be produced by any photodetector. The signal is amplified and directed to the AND gate 17 and also to the OR gate 16. The signal passes through the OR gate 16 to the flip-flop detector. The signal through the flip-flop detector initiates the clock and starts the scan operation. Since the film is moving across the photodetectors all information data in the row being detected will not be over the row of photodetectors and all photodetectors that see data will be producing a signal output. All signal outputs are amplified and directed to the AND gates 17. As each output is scanned, the output through the OR gate 16 and the 110 position counter to the AND gates 17 will trigger the AND gate 17 so that those signal outputs from the photodetectors pass on to the 100 position shift register. The 100 position shift register is activated by the first signal received which will be loaded into the first position. The subsequent signals will be loaded as the shift register shifts and the output signals being scanned will be loaded in their respective positions relative to the first position. That is, since the first channel always has the information data, the output from the photodetector that looks at the first channel will be loaded in the first position in the shift register. If the next bit of data is seen by the fifth detector away from the detector that saw the first bit of data, then the output signal of the detector that saw the second bit of information will be loaded in the fifth position in the shift register. The information loaded into the shift register is loaded relative to the first position according to the position of the respective photodetectors relative to the first photodetector that detects the information in the first channel on the film. The data detected by the photodetectors in order of their scan is loaded into the shift register as the detectors are scanned. The information is retained in the buffer storage until the photodetectors have been scanned three times for each row of information to insure that all bits of information have been detected. The three-counter clock then triggers the dump gate to load the information stored in the buffer storage onto the magnetic tape, computer or any other suitable recorder.

The system as described above makes use of 100 photodetectors which insures that all information contained on a film that is 100 photodetectors wide is detected. There are instances that all channels of the film will not be used, therefore, the number of photodetectors used in the detection can be selected by use of the plug board. Therefore, only those photodetectors selected will be operational to detect data.

The above operation has been described for a multichannel film, however, by use of a continuous scan operation other types of information such as curves may be stored. In detecting curves, a solid line may be used along the edge of the film so that the first photodetector under the film will see the solid line and set the shift register in the first position, then the information will be loaded into the shift register in its proper position relative to the first photodetector that is activated by the solid line.

It is obvious that a system may be made with less than 110 photocells with a scan to match the number of photocells and with a less position shift register. Also the film data may be clear with the remainder of the film opaque such that light shines through the data positions to the photocells. The invention is not limited to film, the information may be on any base such as glass, plastic, etc. so long as the light will shine through to the photocells.

Obviously many modifications and variations of the present invention are possible in the light of the above teachings. It is therefore to be understood that within the scope of the appended claims the invention may be practiced otherwise than as specifically described. What is claimed and desired to be secured by Letters Patent of the United States is:

I claim:

1. A system for electrooptically reading data which comprises:

a light source, a plurality of linearly aligned photosensitive means in optical alignment with said light source for reception of light produced by said light source thereby producing an electrical output corresponding thereto, an electronic scanning means for sequentially scanning the outputs of said photosensitive means, a shift register, means for sequentially loading said output signals into said shift register during scanning of said photosensitive means which output signals correspond to data detected, a plug board means electrically connected with said shift register to facilitate manipulation of data loaded into said shift register, a buffer store means, said buffer store means electrically connected with said plug board means to store data information selected by said plug board for conversion of said data information into compatible formate for serially recording said information data onto a recording means.

2. A system as claimed in claim 1, which includes:

a film upon which separate channels of data are recorded thereon and which passes between said light source and said linearly aligned photosensitive means; and said linearly aligned photosensitive means being of a width which is greater than the width of said film recorded data to allow for sidewise slippage of said film.

3. A system as claimed in claim 2; wherein said photosensitive means is formed by a plurality of separate photocells positioned side-by-side along a single line.

4. A system as claimed in claim 1; which includes:

flip-flop switch means activated by an output from one of said photosensitive means to initiate said scanning of said outputs of said photosensitive means; and gate means for controlling the output signals from said photosensitive means to said shift register.

5. A system as claimed in claim 4, which includes control means for scanning said photosensitive output signals at least once for each sequence of information data prior to loading said data information into a recording means.

6. A system for electrooptically reading data; which comprises:

a light source, a plurality of linearly aligned light detectors positioned in optical alignment with said light source for detection of light incident thereon and producing an electrical signal due to incident light;

a plurality of electrical signal amplifier means, one for each of said light detectors, for amplifying electrical outputs produced by each of said light detectors;

a plurality of AND gates one each directly corresponding with each of said amplifiers for receiving a corresponding amplified signal;

an OR gate for receiving an electrical signal from each of said amplifier means;

a flip-flop control means operative by receipt of an output from said OR gate;

a position counter having a plurality of counter positions each corresponding with a light detector operative by receipt of an output signal from said flip-flop;

said counter electrically connected with said AND gates and operative to sequentially direct an input to each of said AND gates corresponding to output signals from said signal amplifier means;

a shift register;

said shift register operative by a signal from said position counter for receiving output signals from said AND gates and loading said signals in order of receipt;

a buffer store;

an output shift register and;

a plurality of dump gates operatively connected with said shift register and said buffer store to dump stored information through said output shift register to a storage means; and means for resetting said flip-flop for successive storage of information.